United States Patent
Na et al.

(10) Patent No.: US 9,571,781 B2
(45) Date of Patent: Feb. 14, 2017

(54) DISPLAY APPARATUS WITH A SENSOR AND CAMERA AND CONTROL METHOD THEREOF

(71) Applicant: SAMSUNG ELECTRONICS CO., LTD., Suwon-si (KR)

(72) Inventors: Moon-sung Na, Suwon-si (KR); Keun-seok Kang, Yongin-si (KR); Je-hwan Seo, Suseong-gu (KR); Tae-hyeun Ha, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 403 days.

(21) Appl. No.: 14/050,852

(22) Filed: Oct. 10, 2013

(65) Prior Publication Data
US 2014/0152818 A1   Jun. 5, 2014

(30) Foreign Application Priority Data

Dec. 5, 2012 (KR) .......... 10-2012-0140494

(51) Int. Cl.
| | | |
|---|---|---|
| *H04N 5/63* | (2006.01) | |
| *H04N 21/4223* | (2011.01) | |
| *H04N 21/442* | (2011.01) | |
| *H04N 21/422* | (2011.01) | |
| *H04N 21/443* | (2011.01) | |
| *H04N 5/44* | (2011.01) | |

(52) U.S. Cl.
CPC .......... *H04N 5/63* (2013.01); *H04N 21/4223* (2013.01); *H04N 21/42202* (2013.01); *H04N 21/4432* (2013.01); *H04N 21/44218* (2013.01); *H04N 2005/4428* (2013.01)

(58) Field of Classification Search
CPC ........................................ H04N 5/63

USPC .......................................................... 348/143
See application file for complete search history.

(56) References Cited

U.S. PATENT DOCUMENTS

| | | | |
|---|---|---|---|
| 8,223,211 B2 | 7/2012 | Jang | |
| 2007/0063840 A1* | 3/2007 | Jentoft | ............ G08B 13/19641 340/541 |
| 2010/0205667 A1* | 8/2010 | Anderson | ............... G06F 3/013 726/19 |

FOREIGN PATENT DOCUMENTS

| | | |
|---|---|---|
| KR | 1991-0013938 A | 8/1991 |
| KR | 1991-0017856 A | 11/1991 |
| KR | 1992-0014264 A | 7/1992 |
| KR | 2000-0028226 A | 5/2000 |
| KR | 10-2002-0083780 A | 11/2002 |
| KR | 10-2009-0059514 A | 6/2009 |

(Continued)

OTHER PUBLICATIONS

Communication dated Dec. 19, 2013 issued by the Korean Intellectual Property Office in counterpart Korean Patent Application No. 10-2012-0140494.

(Continued)

*Primary Examiner* — Yulin Sun
(74) *Attorney, Agent, or Firm* — Sughrue Mion, PLLC

(57) ABSTRACT

A display apparatus having a sensor and camera and a control method thereof are provided. Exemplary embodiments relate to a display apparatus and a control method thereof which determines through a sensor, such as a pyroelectric infrared ray (PIR) sensor, and a camera, whether a user intends to use the display apparatus, and drives the display apparatus based on the users intentions in order to reduce booting time.

7 Claims, 4 Drawing Sheets

(56) References Cited

FOREIGN PATENT DOCUMENTS

| KR | 10-2009-0069955 A | 7/2009 |
|---|---|---|
| KR | 10-2009-0131202 A | 12/2009 |

OTHER PUBLICATIONS

International Search Report (PCT/ISA/210) dated Jan. 28, 2014 issued by the International Searching Authority in International Application No. PCT/KR2013/009272.

* cited by examiner

DISPLAY APPARATUS WITH A SENSOR AND CAMERA AND CONTROL METHOD THEREOF

CROSS-REFERENCE TO RELATED APPLICATION

This application claims priority from Korean Patent Application No. 10-2012-0140494, filed on Dec. 5, 2012 in the Korean Intellectual Property Office, the disclosure of which is incorporated herein by reference, in its entirety.

BACKGROUND

Field

Apparatuses and methods consistent with the exemplary embodiments relate to a display apparatus and a control method thereof. More particularly, exemplary embodiments relate to a display apparatus and a control method thereof which determines, through a pyroelectric infrared ray (PIR) sensor and a camera, whether a user intends to use the display apparatus, and drives the display apparatus in advance of the user request in order to reduce booting time.

Description of the Related Art

The development of technology has encouraged development of various display apparatuses. A user generally uses a remote controller to turn on a TV. In response to the user pressing an ON button from the remote controller, the TV receives a signal from the remote controller through an infrared sensor. Then, the TV begins its driving operation. From the time the user presses the button on the remote controller to the time when a normal TV screen is driven through a TV panel, booting time is required. However, the user may feel that the booting time takes too long.

SUMMARY

Accordingly, one or more exemplary embodiments provide a display apparatus and a control method thereof which reduces booting time.

Another exemplary embodiment is to provide a display apparatus and a control method thereof which performs a security function.

Still another exemplary embodiment is to provide a display apparatus and a control method thereof which consumes less power.

Yet another exemplary embodiment is to provide a display apparatus and a control method thereof which promotes the convenience of users.

The foregoing and/or other aspects of the exemplary embodiments may be achieved by providing a display apparatus including: a display; at least one sensor configured to sense a motion within a predetermined distance in at least one of front, left and right directions while in an activated state; a camera configured to extract image information of an object located in front of the display apparatus; and a central processing unit (CPU) configured to be activated by a sensing signal from the at least one sensor, activates the camera, and controls power supplied to the display according to an analysis result of the image information of the object provided by the camera.

According to an aspect of another exemplary embodiment, the CPU identifies whether the object is a human or a pet.

According to an aspect of another exemplary embodiment, the CPU determines supply power to the display according to whether the object intends to use the display apparatus, in response to an identification that the object is the human. The foregoing and/or other aspects of the exemplary embodiments may be achieved by providing a display apparatus including: at least one sensor configured to sense a motion within a predetermined distance in at least one of front, left and right directions while in an activated state; at least one camera configured to extract image information of an object; and a central processing unit (CPU) configured to be activated by a sensing signal from the at least one sensor, activates the at least one camera, and performs a security operation according to an analysis result of the image information of the object provided by the camera.

According to an aspect of another exemplary embodiment, the security function may include at least one of outputting a warninging sound, outputting a warning screen, a recording function, and external transmission of data.

According to an aspect of another exemplary embodiment, the data transmitted to the outside may include information that has been recorded by the camera.

According to an aspect of another exemplary embodiment, the CPU compares the image information of the object with stored image information in order to determine whether to perform the security function.

According to an aspect of another exemplary embodiment, the CPU selects and activates the at least one camera in the same direction as the at least one sensor having the sensing signal.

According to an aspect of another exemplary embodiment, the sensor may include one of an infrared sensor, a broadband RF sensor, a radar sensor and an ultrasonic sensor.

According to an aspect of another exemplary embodiment, the sensor is activated through a graphic user interface (GUI).

The foregoing and/or other aspects of the exemplary embodiments may be achieved by providing a control method of a display apparatus including: activating a sensor, transmitting to a central processing unit (CPU) a sensing signal of the sensor in order to activate the CPU; activating a camera by the CPU activated by the sensing signal and receiving from the camera image information of an object located in front of the display apparatus; analyzing the received image information of the object by the CPU; and controlling power supplied to a display according to an analysis result by the CPU.

According to an aspect of another exemplary embodiment, the CPU supplies power to the display in response to an identification, through the analysis of the image information of the object, that the object intends to use the display apparatus.

The foregoing and/or other aspects of the exemplary embodiments may be achieved by providing a control method of a display apparatus including: activating a sensor, transmitting a sensing signal of the sensor to a central processing unit (CPU) to activate the CPU; activating a camera by the CPU, the camera being activated by the sensing signal and receiving from the camera image information of an object located in front of the display apparatus; the CPU searching a database for image information related to the object; and performing a security function in response to no corresponding image information being found.

Another exemplary embodiment may provide a display apparatus for reducing booting time, the display apparatus including: at least one sensor configured to sense a motion within a predetermined distance, while in an activated state; a camera configured to extract image information related to an object located in front of or near the display apparatus;

and a central processing unit (CPU) configured to be activated by a sensing signal from the at least one sensor, activate the camera, and performs a security operation according to an analysis result of the image information related to the object provided by the camera. Power may be turned off except for minimal power to the sensor, prior to the CPU receiving a signal from the sensor.

The CPU may be configured to identify whether the object is a human or a pet, and the security function may include at least one of outputting a warning sound, outputting a warning screen, a recording function and external transmission of data.

The CPU may compare the image information of the object with stored image information in order to determine whether to perform the security function.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
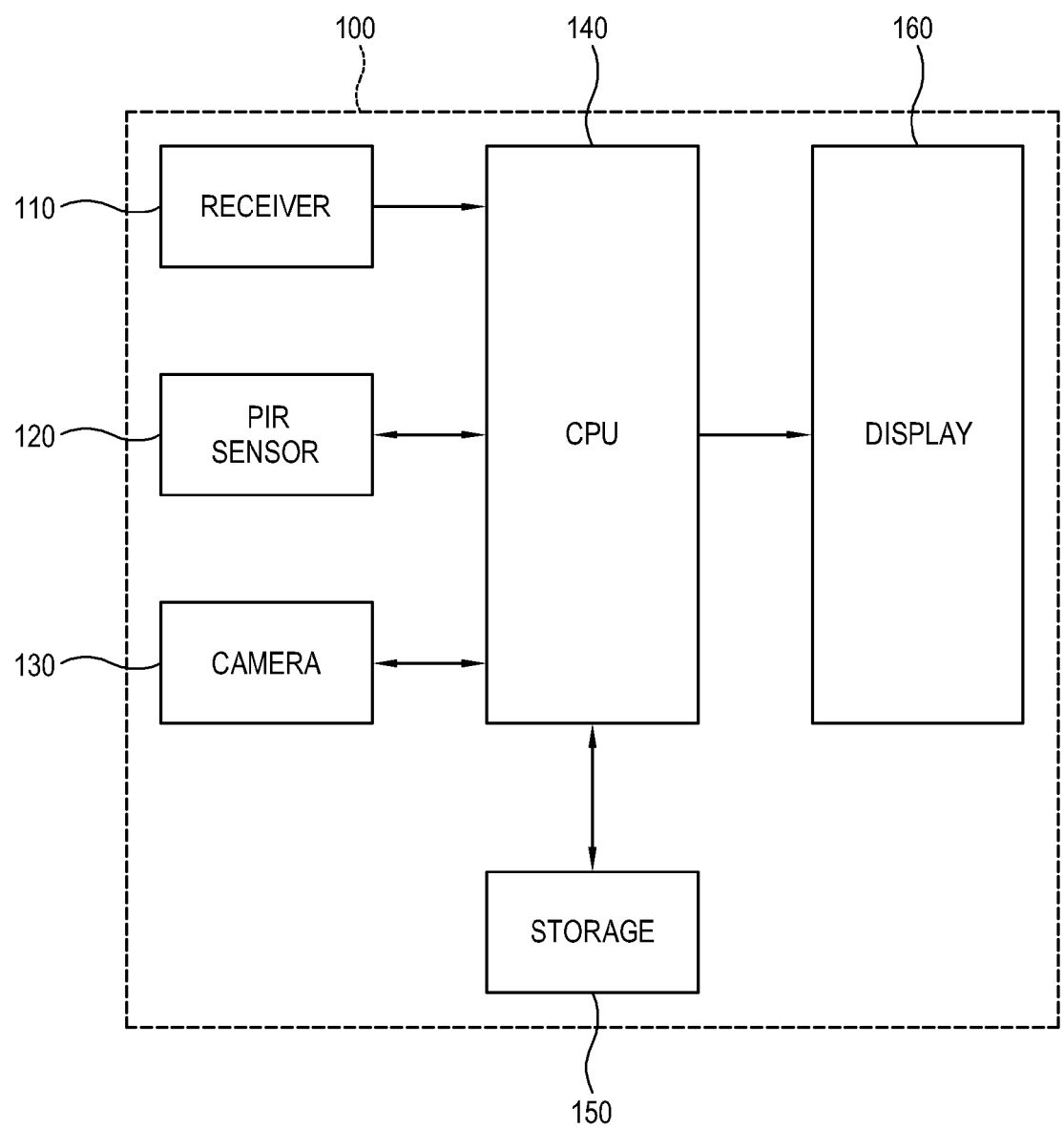
FIG. 1 is a block diagram of a display apparatus according to an exemplary embodiment.

Below, exemplary embodiments will be described in detail with reference to accompanying drawings so as to be easily understood by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of a display apparatus according to an exemplary embodiment.

As shown therein, the display apparatus according to this exemplary embodiment includes a receiver 110, a PIR sensor 120, a camera 130, a central processing unit (CPU) 140 which receives signals from, or transmits signals to, the receiver 110, the PIR sensor 120 and the camera 130, a storage 150 which supplies data necessary for operations of the CPU 140 or stores therein data supplied through the CPU 140, and a display 160 which displays an image thereon to be recognized by a user, based on the data supplied by the CPU 140. The display 160 has an image displaying function and an audio outputting function.

As will be explained below, an example of the display apparatus is a TV, but not limited thereto. Alternatively, the display apparatus may include a DVD player, computer, projector, or other electronic apparatuses which need booting time for implementing substantial operations.

Most of display apparatuses include an infrared sensor or a camera and provide additional services. The display apparatus employing the infrared sensor deems any object having the temperature of a human body, as a human. In response to the heat source making no motion for a certain period of time, the infrared sensor determines that there is no human and thus may turn off the display apparatus or may restrict some of the display functions in order to save power.

In response to the heat source making a motion, the infrared sensor determines that there is a human and thus re-operates the display apparatus. In the case of a display apparatus in which a camera is installed, in response to there being a form of a human (determined on the basis of face/the trunk/pupil), the display apparatus determines that there is a human, according to its algorithm, and controls its functions. With the foregoing technology, the display apparatus may reduce power consumption or may monitor the environment where there is no one. In response to an infrared sensor being used, the display apparatus may react to an animal rather than a human, or may malfunction with respect to a motion that is not made with the intention of viewing the display apparatus. That is, in response to a pet wandering about when there is no human, or any person goes past the display apparatus to do other things, the display apparatus may operate. The display apparatus, using a camera, may distinguish human and animals through the location of face and pupil, and may even identify whether or not the human is viewing the display apparatus. That is, the display apparatus malfunctions less in recognizing a human body. To do so, a control circuit should be driven to process images taken by the camera, and power consumption occurs.

The receiver 110 collectively refers to an element which acts as an interface configured to receive an input signal from the outside or from a remote controller in a wired/wireless manner, as well as receiving a broadcasting signal. For example, in response to a power control signal being transmitted through a remote controller, power supplied to all elements of the display apparatus except for the sensor is cut off and the control operation of the display apparatus is started.

The sensor according to this exemplary embodiment may include at least one of an infrared sensor, a broadband RF sensor, a radar sensor using a 10 GHz or higher frequency band and an ultrasonic sensor. The sensor may be installed within/outside the display apparatus and may transmit a sensing signal to the display apparatus. Depending on the type of system, the display apparatus may include a CPU which is driven by minimum power. Depending on the type of system, a processor may be installed in the camera to process and determine an image input by the camera, or the sensor may be installed in the CPU.

An example of the sensor may include a pyroelectric infrared ray sensor (PIR sensor). The PIR sensor uses pyroelectric effect where a ferroelectric material which absorbs infrared heat energy causes spontaneous polarization, and in proportion to the change in the polarization, electric charge is abandoned. In response to the sensor 120 including a PIR sensor, the PIR sensor senses infrared rays emitted by an object in response to such object being near the monitored area. Hereinafter, an example of the sensor installed in the display apparatus will be described.

The camera may include a complementary metal oxide semiconductor (CMOS) camera or charge-coupled device (CCD) camera. The CMOS camera is an imaging device which directly amplifies an electric charge into an electric signal through amplifiers provided in all photodiodes. The CMOS camera has a simple circuit configuration and thus consumes less power and requires lower manufacturing costs. As the amplifiers are provided in all photodiodes, the CMOS camera provides non-uniform image quality and may have worse quality than a CCD.

Figure 2:
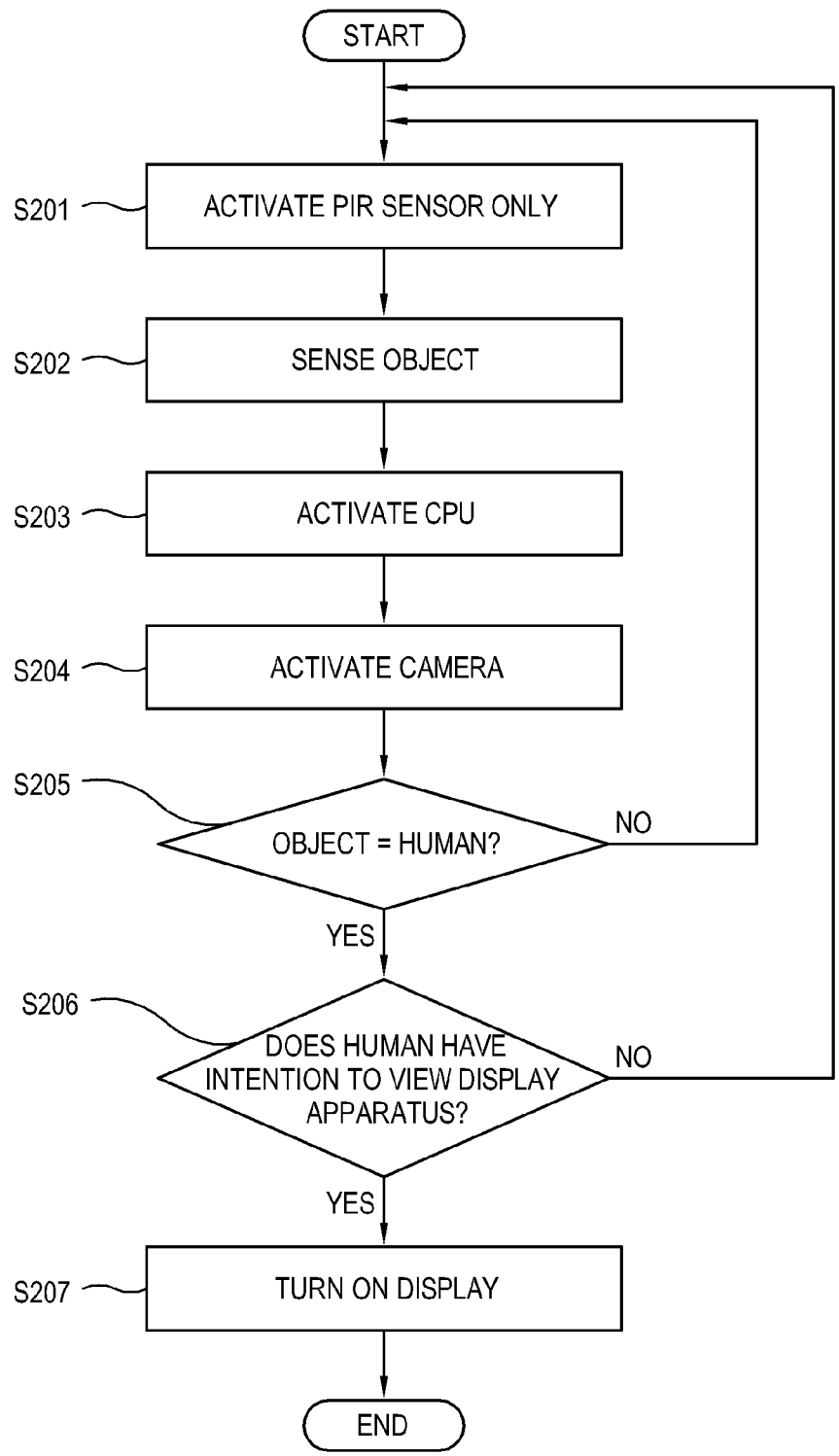
FIG. 2 is a flowchart showing a method of controlling the display apparatus in FIG. 1.

FIG. 2 is a flowchart showing a method of controlling the display apparatus in FIG. 1. Except for the sensor, power supplied to all of elements of the display apparatus is cut off. Activation of a power control function of the display apparatus may be set by a user. More specifically, a user may set the power control function through a remote controller; a switch provided in the display apparatus or by graphic user interface (GUI). Further, a user may activate the power control function by using a reservation function or may activate the power control function automatically in response to an image of an object not being sensed until a predetermined time has past. Turning on or off any element may be decided as intended by a user or depending upon the nature of the display apparatus. In response to the power control function being activated, only the sensor operates through a minimum driving current. In response to the sensor being provided outside the display apparatus, only a predetermined device which is capable of receiving a signal from the sensor may be activated (S201).

The sensor that is activated solely senses a motion of an object located within a predetermined distance from the display apparatus. The sensor may include at least one of an infrared sensor, a broadband RF sensor, a radar sensor and an ultrasonic sensor (S202). The infrared sensor may be implemented as a PIR sensor.

A sensing signal of the at least one sensor is transmitted to the CPU. Upon receiving the sensing signal from the sensor, the CPU is activated (S203).

The CPU which is activated by the sensing signal outputs a control signal to activate the camera. The camera which is activated by the CPU acquires image information related to the object. The camera transmits to the CPU the image information related to the object (S204).

Upon receiving the image information of the object from the camera, the CPU determines whether the object is a human or a pet, based on the received image information related to the object. In response to a determination that the object is a pet, the display apparatus returns to its original state. That is, the power supplied to the camera is cut off, and the signal is transmitted to a power source (not shown) to cut off power supplied to the CPU. Accordingly, the power supplied to all of elements of the display apparatus except for the sensor is cut off (S205).

In response to the CPU determining that the object is a human, the CPU analyzes the image information related to the object. According to the analysis result, the CPU controls power supplied to the display. That is, the CPU determines whether the image information related to the object includes an image indicating a user's intention to use the display apparatus. For example, the CPU determines whether the image information includes recognition of a face and pupil of the object or a touch of the remote controller by the object. The intention to use the display apparatus may be identified in response to predetermined time having past while the object located within the predetermined distance is looking to the display apparatus (S206).

In this case, the CPU determines that the object intends to use the display apparatus, and supplies power to the display, including a backlight, configured to perform normal operations. Further, the CPU may supply power to all elements of the display apparatus, including a network (S207).

In response to a user's sight being directed toward another direction for a long time, or in response to a user being asleep, or the user is determined to have disappeared from the recognizable area of the camera, the display apparatus according to this exemplary embodiment may perform the power control function. For example, the display apparatus may turn off the backlight, gradually reduce the brightness of the screen or may cut off power supplied to all of elements of the display apparatus, other than the sensor, to prevent unnecessary power consumption. Of course, the control function may be performed in connection with the display apparatus and the control method thereof, as shown in FIGS. 1 and 2.

Figure 3:
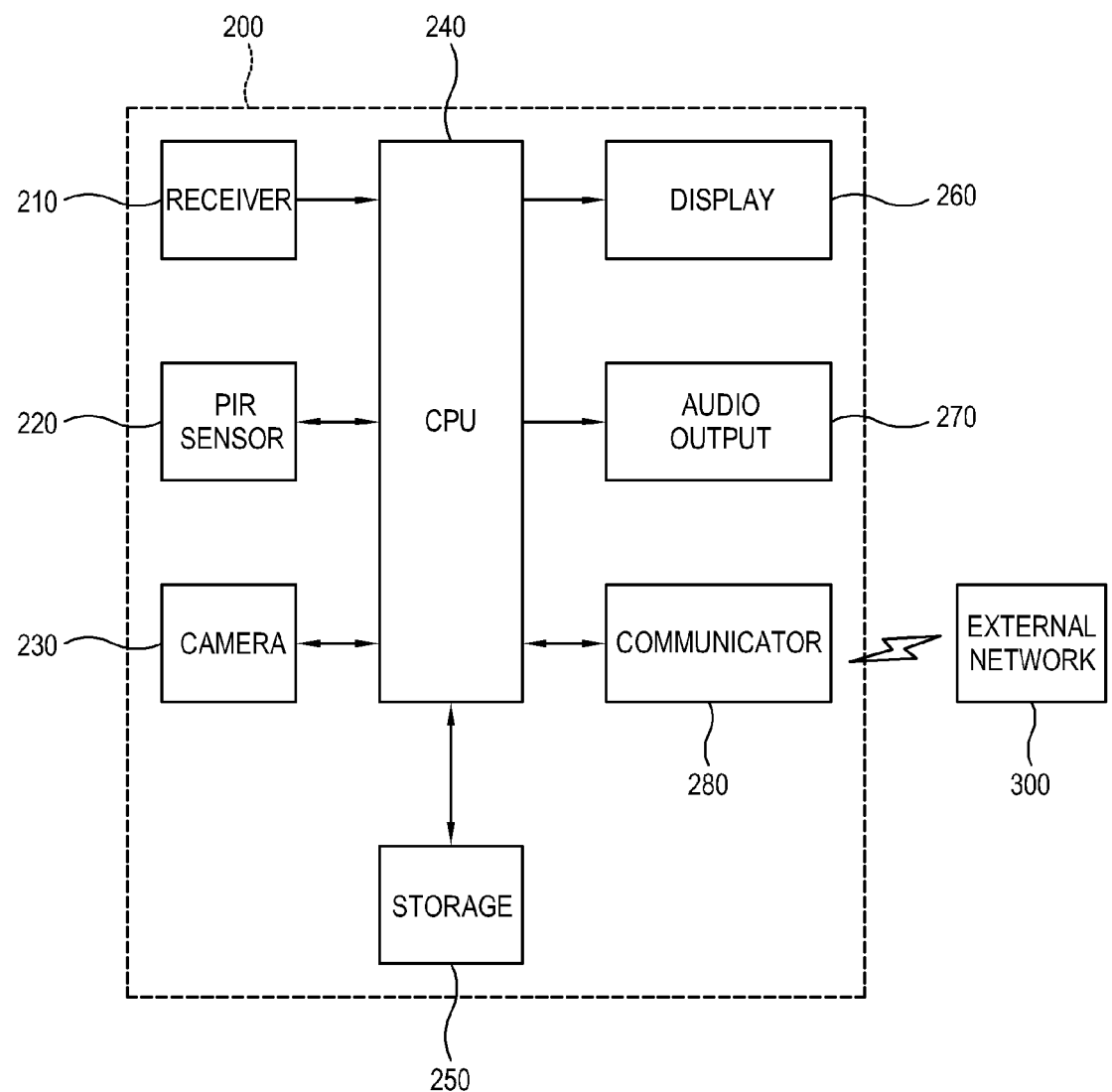
FIG. 3 is a block diagram of a display apparatus according to another exemplary embodiment.
Figure 4:
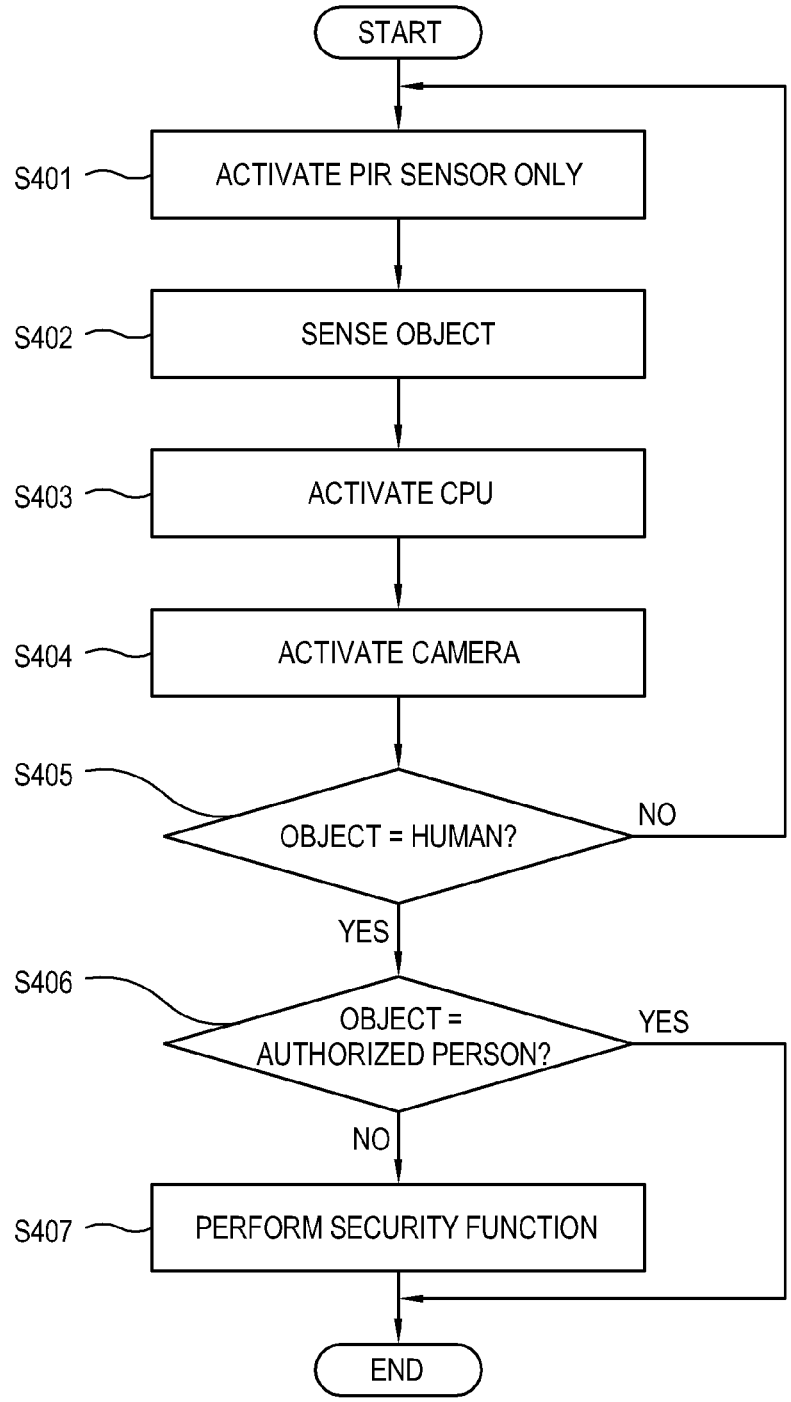
FIG. 4 is a flowchart showing a method of controlling the display apparatus in FIG. 3.

FIG. 3 is a block diagram of a display apparatus according to another exemplary embodiment. FIG. 4 is a flowchart showing a method of controlling the display apparatus in FIG. 3. The first exemplary embodiment relates to the control method for reducing power consumption, and this exemplary embodiment relates to a device and a method for performing a security function as well as power consumption.

As shown in FIG. 3, the display apparatus according to the another exemplary embodiment includes a receiver 210, at least one sensor 220, which may be implemented as a PIR sensor as shown, at least one camera 230, a central processing unit (CPU) 240 configured to receive signals from, or transmit control signals to, the receiver 210, the sensor 220 and the camera 230; a storage 250 configured to supply data necessary for operations of the CPU 240 or may store therein data supplied through the CPU 240; a display 260 configured to display an image thereon to be recognized by a user, based on the data supplied by the CPU 240, an audio output 270 which outputs a warning sound or recorded audio information based on a control signal from the CPU 240, and a communicator 280 which may be configured to exchange data with an external network 300 in a wired/wireless manner. The audio output 270 may be included in the display 260. The same operations as those according to the first embodiment will not be explained, repetitively.

Detailed operation of each element will be described with reference to FIG. 4.

A user may activate or inactivate a security function through setup of the display apparatus. The security function may be activated by a setting signal from the outside, as the case may be. As explained above, the security function may be set through a remote controller, GUI, or a setup button in the display apparatus (S401).

In response to one of the foregoing setting methods being used to activate the security function, power supplied to all of the elements of the display apparatus, except for the sensor 220 is cut off, and only the sensor 220 is activated. Thus, only minimum power is consumed. The sensor 220 may sense an object located within a predetermined distance in three directions of forward, left and right directions from the place where the display apparatus is located. The sensing capability of each sensor may be equal or different. Further, a plurality of sensors may be selectively activated by a user's setting. In response to at least one sensor sensing the object (S402), the sensor transmits a sensing signal to the CPU 240 (S402).

The CPU 240 is activated by the sensing signal. The activated CPU 240 outputs a control signal to a camera 230 to supply power thereto. The CPU 240 may select the camera 230 pointing in the same direction as the sensor which has transmitted the sensing signal, and may supply power to the selected camera 230.

The camera 230 which is activated by the control signal of the CPU 240 extracts image information related to the object and transmits the image information to the CPU 240 (S404).

The CPU 240 determines whether the object is a human or a pet, based on the image information related to the object transmitted by the camera 230. In response to a determination that the object is a pet, the CPU 240 outputs a control signal to return to an initialization state for the security function. That is, the CPU 240 outputs a signal to a power source (not shown) to cut off power supplied to the CPU 240 itself as well as power supplied to the camera 230 (S405).

In response to a determination that the object is not a pet but a human, the CPU 240 searches the image information of the object from the storage 250. The image information stored in the storage 250 is image information relating to a human who is allowed to use the display apparatus. The CPU 240 determines whether the object is an authorized person. If so, the CPU 240 may return to its original state, as in the case where the object is determined to be a pet at operation S405, or may determine whether the object intends to use the display apparatus, as in the first exemplary embodiment (S406).

In response to the object being an authorized person who is authorized to use the display apparatus, e.g. a family member, the CPU performs the security function. The security function may be performed in various forms. For example, a warning sound may be output through the audio output 270, or the display 260 may be driven to output a warning screen in order to notify the object that the security function is being performed. At the same time, the image information related to the object that is extracted through the camera 230 may be transmitted to the external network 300 through the communicator 280 without any additional alarm operation. The external network 300 may refer to an owner of the display apparatus 200 or a device which can provide information to a nearby police station or a security service company. The information transmitted to the external network 300 through the communicator 280 may include a text message that is transmitted together with, or separately from, the image information related the object. The image information related to the object may be stored in the storage 250 (S407).

The display apparatus and a control method thereof according to the exemplary embodiments may have the following effects:

First, power consumption of the display apparatus may be reduced.

Second, booting time for the display apparatus may be reduced.

Third, a security function may be performed.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display apparatus comprising:
 a display;
 at least one sensor configured to sense a motion within a predetermined distance in at least one of front, left and right directions, while in an activated state without supplying power to the display apparatus except for the at least one sensor;
 a camera configured to extract image information related to an object which is located in front of or near the display apparatus; and
 a central processing unit (CPU) configured to be activated by a sensing signal from the at least one sensor in response to the at least one sensor sensing the motion, to control power supplied to the camera to be activated in response to the CPU being activated, and to control power supplied to the display according to an analysis result of the image information related to the object provided by the camera.

2. The display apparatus according to claim 1, wherein the CPU is configured to identify whether the object is a human or a pet.

3. The display apparatus according to claim 2, wherein the CPU is configured to determine whether to supply power to the display according to whether the object intends to use the display apparatus, in response to an identification that the object is the human.

4. The display apparatus according to claim 1, wherein the at least one sensor comprises one of an infrared sensor, a PIR sensor, a broadband RF sensor, a radar sensor and an ultrasonic sensor.

5. The display apparatus according to claim 1, wherein the at least one sensor is activated through a graphic user interface (GUI).

6. A method of controlling a display apparatus, the method comprising:
 activating a sensor without supplying power to the display except for the sensor;
 transmitting a sensing signal of the sensor to a central processing unit (CPU) in order to activate the CPU in response to the sensor sensing a motion within a predetermined distance;
 controlling power supplied to a camera by the CPU in response to the CPU being activated, the CPU being activated by the sensing signal, and receiving from the camera image information related to an object located in front of or near the display apparatus;
 analyzing the received image information related to the object by the CPU; and
 controlling power supplied to a display according to an analysis result by the CPU.

7. The control method according to claim 6, wherein the CPU supplies power to the display in response to an identification, through the analysis of the image information related to the object, that the object intends to use the display apparatus.

* * * * *